Nov. 6, 1951　　　H. J. HERSEY, JR　　　2,573,844
DUST FILTER
Filed Oct. 11, 1949

INVENTOR.
HENRY J. HERSEY, JR.
BY
James D. Bock
ATTORNEY

Patented Nov. 6, 1951

2,573,844

UNITED STATES PATENT OFFICE 2,573,844

DUST FILTER

Henry J. Hersey, Jr., Chatham, N. J.

Application October 11, 1949, Serial No. 120,679

9 Claims. (Cl. 183—61)

The present invention relates to dust filters and more particularly to an improvement in dust filters of the general type disclosed in my co-pending application S. N. 683,018 filed July 12, 1946, now Patent Number 2,495,635. The present invention will be illustrated as applied to a dust filter substantially identical to that disclosed in said co-pending application, although it will be understood that the invention is adaptable to filters differing in detail from the one therein disclosed.

In said Patent Number 2,495,635 there is disclosed a dust filter wherein a porous, flexible filter medium is so arranged as to have dust laden gas introduced to one side thereof under a gaseous pressure greater than that existing on the other side whereby the solid material with which the gas is laden will be deposited in the form of a layer upon the high pressure side of the filter medium. A cleaning device of the reverse jet type is provided wherein air or other clean gas is supplied under relatively high pressure to a hollow member having an orifice disposed in contact with the low pressure surface of the filter medium. The air emitted from the orifice is projected through the filter medium in the form of a jet which serves to dislodge the accumulated solids from the localized area of the low pressure side of the filter medium directly opposite the orifice.

In said Patent Number 2,495,635 there is disclosed means for moving the reverse jet cleaning device progressively over substantially the entire low pressure surface of the filter medium whereby the solids are progressively removed from substantially the entire high pressure surface thereof. The cleaning operation may be carried on continuously although in many installations it is preferred to operate the cleaning device only when the differential in pressure between the opposite sides of the filtering medium becomes so great as to indicate that the filter is operating inefficiently because of the accumulation of an unduly thick layer of solids.

Since the cleaning operation normally takes place while the filter continues to operate, it will be apparent that there is a considerable tendency toward the redeposition of the solids dislodged by the cleaning device upon an adjacent area of the filter medium. As disclosed in said Patent Number 2,495,635 it has been found highly desirable to clean a vertically disposed filter medium by means of a horizontally disposed reverse jet which operates only on the down stroke so that the freshly cleaned surface will always lie above the cleaning device.

The present invention constitutes a further improvement directed to the problem of avoiding the redeposition of the solids dislodged by a reverse jet cleaning device of the general type described. According to the present invention several partitions are provided on the high pressure side of the filter medium which serve substantially to isolate the particular section of the filter medium which is being subjected to the cleaning operation. Such isolation substantially brings to an end the tendency of the gas on the high pressure side of the filter to flow toward that section of the filter and therefore the solids dislodged in cleaning do not meet currents of gas which tend to return them to the freshly cleaned portion of the filter. Under these conditions the dislodged solids are free to gravitate toward the bottom of the filter.

In the form of the invention chosen for illustration the filter medium is of cylindrical form and the reverse jet cleaning device comprises a blow ring surrounding the cylindrical filter. The partitions for a filter of that type may take the form of frusto-conical bodies of thin durable sheet material arranged in spaced nesting relation within the filter. The smaller-diameter ends of the partitions are directed downwardly and the larger-diameter ends are of a diameter slightly less than the inner diameter of the cylindrical filter medium. As the blow ring reaches any particular portion of the filter it presses the filter medium inwardly toward the larger-diameter ends of adjacent partitions thus defining a downwardly inclined passageway which is substantially isolated from the remainder of the interior of the filtering device.

The object of the invention is to provide a structure which will operate as generally described above. Other and further objects will become apparent upon a consideration of the following detailed description of preferred but not necessarily the only forms of the invention taken in connection with the drawings accompanying and forming a part of this specification.

Figure 1:
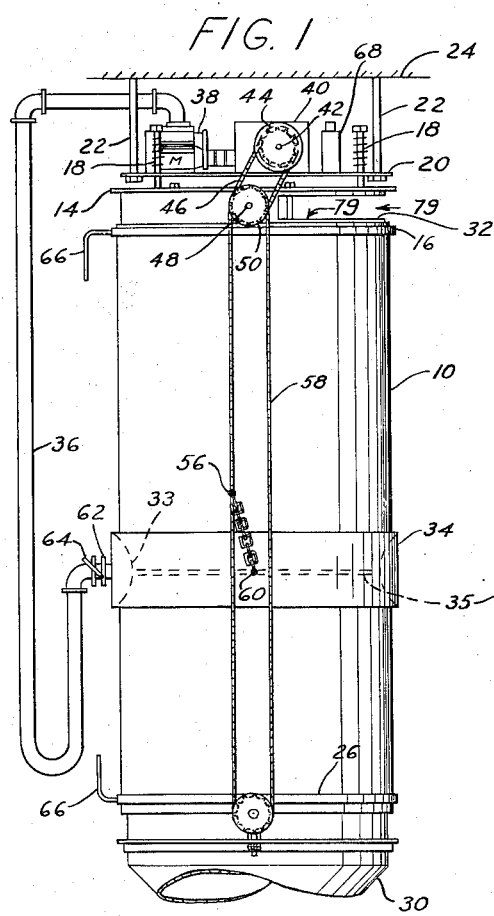
Figure 1 is an elevational view of a filter embodying the present invention.

Referring now to the drawings, the invention is illustrated as applied to a dust filter substantially identical with that shown in said co-pending application S. N. 683,018, now Patent Number 2,495,635, and reference is made to said patent for a disclosure of full details of that filter. Certain essential parts thereof will be briefly described herein.

A filter medium 10, preferably made of felt or felted material having interstices much smaller than the thickness of the material, is arranged in cylindrical conformation and suspended from a cylindrical upper body 12 having a cover plate 14 of disc-like conformation secured thereto. The filter medium 10 may be secured to the cylindrical body 12 by a suitable clamping ring 16. The cover plate 14 is suspended by rods 18 secured to a platform 20 supported by rods 22 which are attached to a suitable fixed overhead structure 24.

At its lower end the filter medium 10 may be secured by a clamping ring 26 to a cylindrical bottom member 28 which is provided with a conical portion 30 which serves as a hopper for the accumulation of solids separated from the dust laden gas.

The dust laden gas is introduced into the upper cylindrical body 12 through an inlet 32 and is supplied thereto by means (not shown) which place the gas at a pressure slightly higher than the pressure existing on the outside of the filter medium 10. Ordinarily the dust laden gas will be supplied at a pressure somewhat above atmospheric pressure and the outer surface of filter medium 10 will be exposed to the atmosphere, although of course the entire filter unit may be enclosed within a suitable casing maintained at sub-atmospheric pressure so as to draw the dust laden gas into the inlet 32.

The reverse jet cleaning apparatus may be similar to that shown in said Patent Number 2,495,635. It includes a hollow blow ring 34 having an inner diameter somewhat less than the diameter of the cylindrical filter medium 10. The blow ring 34 has a convex inner wall 33 having a narrow slot or orifice 35 extending around the inner diameter thereof in contact with the outer surface of the filter medium 10. The blow ring is connected, as by a flexible hose 36 and suitable piping, with a rotary blower 38, preferably of the positive pressure type. The blower 38 is mounted on the platform 20 and may be driven by a motor M. The motor M also serves to drive a speed reducer 40, the slow speed shaft 42 of which carries a pulley 44 connected by a belt 46 and pulley 47 with a horizontally disposed shaft 48 mounted in the upper cylindrical body 12.

At its opposite ends the shaft 48 has fixed thereto sprocket wheels 50 on which are carried chains 52. The chains 52 extend vertically of the filter and around idler sprockets 54 secured to the bottom member 28 of the filter.

Each of the chains 52 has an arm 56 secured to one link thereof which is connected by a suitable length of flexible chain 58 with an arm 60. The two arms 60 are fastened at diametrically opposite points to the blow ring 34.

The mechanism just described serves to move the blow ring 34 vertically relative to the filter medium 10 at a relatively slow rate of speed. The flexible chain 58 is of sufficient length to permit the arms 56 to swing over the sprockets 50 or under the sprockets 54 at the ends of each stroke to thereby cause reversal of the direction of movement of the blow ring even though the chains 52 continue to move in one direction.

If it is desired to render the blow ring 34 inoperative on its upward stroke, this may be accomplished by means such as that shown in said Patent Number 2,495,635 which includes a valve 62 having an operating lever 64 so positioned as to engage alternately with abutments 66 located at the upper and lower ends of the filter. Engagement between the lever 64 and the abutment 66 at the bottom of the filter will be effective to swing the lever upwardly into the position shown in Figure 1 wherein the supply of high pressure air is cut off from the blow ring 34 during the time that the blow ring moves upwardly. When the blow ring reaches the upper end of its stroke, the lever 64 strikes the upper abutment 60 to open the valve and render the blow ring operative during the down stroke.

Also as shown in said Patent Number 2,495,635 the filter may be equipped with a pressure switch 68 communicating with the interior of the filter and operative in response to the differential in pressure between the inside of the filter and the outside thereof. The switch 68 is connected with the motor M so as to energize it for performance of the cleaning operation when the differential in pressure is sufficiently high to indicate that the layer of solids accumulated upon the filter medium has passed a predetermined thickness. The reverse jet cleaning apparatus will then proceed to operate until it has removed sufficient of the accumulated solids from the interior surface of the filter medium 10 to restore the filter to its desired efficiency. This will be indicated by a decrease in the differential in pressure between the outside and the inside of the filter to a predetermined degree.

Referring now to Figures 1 through 4, there is shown, applied to a filter of the type just described, one embodiment of apparatus for securing the objects of the present invention. This structure comprises essentially a plurality of frusto-conical partitions 70 which are substantially identical and one frusto-conical partition 72 which may be slightly larger than the partitions 70 if so desired for a purpose to be described. The partitions 70 and 72 may be supported inside the filter by means of flexible cables 74 which may be fastened in any convenient manner to the cover member 14.

The cables 74 each carry a vertically spaced series of brackets 78 secured to the cables at properly spaced intervals. The brackets 78 are preferably made of relatively light sheet metal and have a horizontally extending portion which is secured to the cables as aforesaid and an upwardly directly angularly disposed portion which is adapted to lie outside the partitions 70 or 72 so that the partitions may rest securely within the brackets.

The partitions are preferably made of relatively thin, durable sheet material such as sheet metal or a suitable plastic sheeting. They may be formed by cutting a suitable flat blank from the sheet material and uniting the edges to form open-ended frustro-conical bodies.

Figure 2:
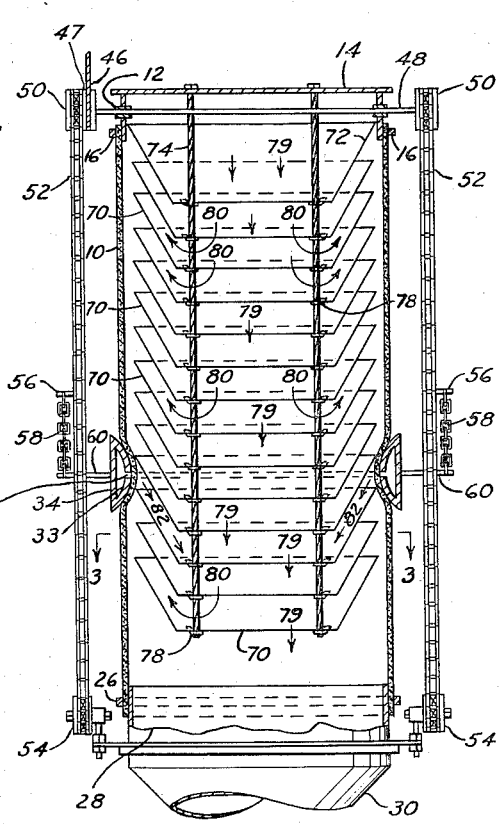
Figure 2 is a view partly in vertical section and with parts broken away showing the interior of the filter illustrated in Figure 1.

As shown in Figure 2 the partitions are disposed in nested relationship with the small-diameter end down so as to form a series of flared or inclined pasageways therebetween.

Since the inlet 32 for the dust laden gas is located at the upper end of the filter, it will be apparent that the gas will flow downwardly into the filter through the vertical passageway provided by the smaller-diameter ends of the partitions 72 and 70. Preferably the upper partition 72 is of such diameter as to engage the inner surface of the upper cylindrical member 12 whereby in effect to funnel the incoming gas directly to the passageway in the central zone of the filter where it will flow downwardly as indicated by the arrows 79. If so desired the partition 70 may be permanently secured to the member 12. The remaining partitions 70 are of a diameter somewhat less than that of the inner surface of the filter medium 10 so as to leave some space between the larger-diameter edges thereof and the inner surface of the filter medium.

Since the only means of escape for the gas introduced through inlet 32 is through the porous wall of the filter medium 10, the gas must flow upwardly and outwardly through the flared passageways between adjacent partitions 70 or 72 as indicated by the arrows 80 in Figure 2. It will be apparent that the change in direction of flow of the dust laden gas as indicated by the arrows 80 will tend to throw a portion at least of the particles downwardly. Those particles which remain with the gas as it flows upwardly in the passageways between adjacent partitions will be deposited upon the inner surface of the filter medium 10.

The solids dislodged by the reverse jet cleaning device will tend to fall downwardly through the passageway between the adjacent partitions opposite which the blow ring 34 happens to be at any time during its operation. It will be noted particularly in Figure 2 that the convex inner wall 33 of the blow-ring 34 is curved in such manner as to engage an area of the filter medium 10 having a vertical dimension greater than the vertical spacing between the edges of adjacent partitions 70. Thus during the entire time that the orifice 35 is moving between two adjacent partitions 70, the filter medium 10 will be displaced inwardly substantially into contact with the edges of these partitions. Since the area of the filter medium in contact with the blow tube wall 33 is rendered impervious thereby the passageway into which the particles are being dislodged is effectively isolated and devoid of upwardly directed currents of dust-laden gas. The dislodged particles therefore fall freely through the passageway and enter the downwardly moving current of gas in the central part of the filter where most of the particles will gravitate directly to the hopper 30.

The device of the present invention is particularly desirable because it offers the opportunity of maintaining the filter medium 10 in a condition for maximum efficiency both from the standpoint of volume of gas handled and from the standpoint of detention of even the finest particles. The volume of gas which will pass through the filter medium is of course greater when the filter medium is entirely clean, but there is a greater tendency on the part of the entirely clean filter medium to permit the passage of some very fine particles. When a clean filter has been operated for a relatively short period of time, its inner surface becomes plugged to a certain extent with the solid material from the dust laden gas, and its power to detain extremely fine particles is greatly enhanced. While this has been recognized from a theoretical standpoint in the past, it is believed that the present apparatus is the first to make it possible to maintain the filter medium in a condition for its most efficient operation. Thus the pressure and volume of clean air supplied to the blow ring 34 may be so adjusted with regard to the type of dust being operated upon and with regard to the load carried by the dust so as to remove the major portion of accumulated solids and yet not to remove all of such solids upon each operative stroke of the blow tube. Prior to the present invention it had been necessary to try to remove all of the solids from the filtering medium with the foreknowledge that a certain percentage of such solids would be immediately redeposited upon the freshly cleaned portion.

In the embodiment of the invention described above in connection with Figures 1 through 4 the partitions 70 are of such size that the larger-diameter edges thereof are just about engaged by the filter medium 10 when the blow ring 34 presses it inwardly. The mounting of the partitions on the flexible cables 74 permits the partitions to move to conform to any irregularities in shape of the filter medium or in the path of movement of the blow ring 34. The mounting of the partitions 70 on the flexible cables 74 also facilitates assembly of the device within the filter since the cables may be manipulated while the partitions are individually placed upon the brackets 78.

Figure 5:
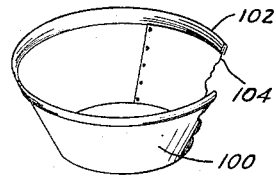
Figure 5 is a view similar to Figure 4 showing a modified form of partition; and, Figure 6 is a view similar to Figure 4 showing a further modified form of partition.
Figure 3:
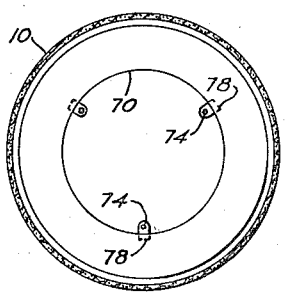
Figure 3 is a section along the line 3—3 in Figure 2.
Figure 6:
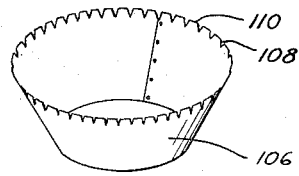

In Figures 5 and 6 there are shown modified forms of partitions in which the larger diameter edges are made flexible whereby this diameter may more closely approach the inner diameter of the filter medium 10. From a consideration of Figure 2 it will be apparent that the maximum inward deflection of the filter medium 10 occurs at the highest point of the convex inner wall 33 of the blow ring 34, and that it is at this point that the slot or orifice 35 is located. By making the partitions with flexible edges it is possible to permit the passage of this high point which will cause some deflection of the flexible edges and thereafter while the high point lies between adjacent partitions the flexible edges will form a more effective seal against the inner surface of the filter medium. In this manner the isolation of the passageway through which the dislodged particles move may be somewhat more complete than in the form of the invention shown in Figure 2.

Figure 4:
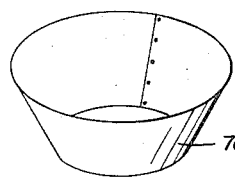
Figure 4 is a detailed view of one of the partitions illustrated in Figure 2.

In Figure 5 a partition 100, which may correspond entirely with the partition 70 shown in Figure 4, is provided with a flexible flange extension 102. Preferably the flange extension 102 is formed of rubber or similar material and is provided with a slot 104 in one edge thereof, which may receive the larger diameter edge of the partition 100. The extension flange 102 may be secured in this position by the use of cement or in any other suitable manner. The width of the extension flange 102 is so chosen as to secure the isolation effect discussed above without being so wide as to be too severely distorted upon the passage of the high point of the wall 33.

In Figure 6 a partition 106 is shown in which the larger diameter edge is serrated as by forming notches 108 therein. In this modification the larger diameter edge may be of such diameter as to quite closely approach the inner surface of the filter medium 10 in its normal position. When the blow ring 34 passes such partition, the teeth 110 will be deflected inwardly by the high point of the wall 33 and thereafter will form a reasonably tight seal with the inner surface of the filter medium 10 while the blow ring is operating between adjacent partitions 106. In this modification the partitions 106 should be made of a sheet material which is inherently sufficiently flexible to permit the deflection of the teeth 110 as described. It has been found that relatively light gage sheet metal or sheet plastic material is admirably adapted for the purpose.

The above detailed description of preferred forms of the invention has been made for the purpose of complying with the patent statutes, and the invention has been disclosed in conjunction with a cylindrical filter device of one particular type. It is to be understood that the invention may be adapted to cylindrical filter devices of various forms and further that it may be adapted to filter devices in which the filter medium takes a shape other than that of a cylinder. In the latter case the partitions may be suitably shaped to conform with the shape of the filter medium as will be readily apparent. The terms used in describing this invention are to be taken in a descriptive rather than in a limiting sense, and the scope of the invention is that established by the appended claims.

What is claimed is:

1. In a dust filter, the combination of a porous flexible filter medium, means for introducing dust laden gas to one side of said filter medium at a gaseous pressure higher than that existing on the other side of said filter medium, means on the high pressure side of said filter medium defining an accumulation zone to which solid particles separated from said dust laden gas may gravitate, a reverse jet cleaning device located on the low pressure side of said filter medium for dislodging solids from the high pressure side of said filter medium, said cleaning device being pressed against said filter medium in opposition to the pressure of the dust laden gas therein whereby to deflect adjacent portions of said filter medium inwardly of the high pressure side thereof, a plurality of partitions located on the high pressure side of said filter medium, said partitions having edges extending into proximity with said high pressure side and being so constructed and arranged as to define a plurality of passageways extending downwardly from said high pressure side toward said accumulation zone, means for moving said cleaning device relative to said filter medium whereby successively to deflect portions of the high pressure side thereof substantially into contact with the edges of adjacent partitions and to dislodge accumulated solids from said high pressure side into the passageway between said adjacent partitions for gravitation therethrough to said accumulation zone.

2. In a dust filter, the combination of a porous flexible filter medium, means for supporting said filter medium in the shape of a vertically disposed cylinder, means for introducing dust laden gas to the upper region of the inside of said cylindrical filter medium at a gaseous pressure higher than that existing on the outside thereof, a reverse jet cleaning device including a blow ring outside said filter medium and having an inner diameter smaller than the diameter of said cylindrical filter medium when inflated by the dust laden gas therein, means for moving said blow ring relative to said filter medium so as to progressively dislodge solids from substantially the entire inside surface of said filter medium, and partitions having edges adjacent the inside surface of said filter medium for defining a plurality of passageways inclined downwardly from said surface and toward the central zone of said filter, the movement of said cleaning device relative to said filter medium being effective to position said cleaning device successively opposite said passageways and to deflect adjacent portions of the inside surface of said filter medium substantially into contact with said edges of said partitions whereby the solids dislodged by said cleaning device may gravitate downwardly through said passageways and into said central zone.

3. In a dust filter, the combination of a porous flexible filter medium, means for supporting said filter medium in the shape of a vertically disposed cylinder, means for introducing dust laden gas to the upper region of the inside of said cylindrical filter medium at a gaseous pressure higher than that existing on the outside thereof, a reverse jet cleaning device for dislodging solids from the inner surface of said filter medium including a blow ring outside said filter medium and having an inner diameter smaller than the diameter of said cylindrical filter medium, a plurality of open-ended frusto-conical partitions arranged in vertically spaced nested relation within said cylindrical filter medium, the smaller ends of said partitions being disposed downwardly and the larger diameter ends extending into proximity with the inner surface of said filter medium, said partitions defining a plurality of passageways therebetween which extend downwardly from said inner surface and toward the central zone of said filter, and means for moving said blow ring relative to said filter medium whereby progressively to deflect portions of said filter medium inwardly substantially into contact with the larger diameter ends of said partitions and progressively to dislodge solids from the inner surface of said filter medium into said passageways.

4. In a dust filter, the combination of a porous flexible filter medium, means for supporting said filter medium in the shape of a vertically disposed cylinder, means for introducing dust laden gas to the upper region of the inside of said cylindrical filter medium at a gaseous pressure higher than that existing on the outside thereof, a reverse jet cleaning device for dislodging solids from the inner surface of said filter medium including a blow ring having a convex inner wall encircling said filter medium and having a narrow annular orifice therein, the inner diameter of said blow ring being such that a substantial area of said convex inner wall including said orifice is pressed firmly into contact with the outside surface of said filter medium, a plurality of open-ended frusto-conical partitions arranged in vertically spaced nested relation within said cylindrical filter medium, the smaller ends of said partitions being disposed downwardly and the larger diameter ends extending into proximity with the inner surface of said filter medium, the vertical spacing between said larger diameter ends being substantially smaller than the vertical dimension of the area of the convex inner wall of said blow ring which is in contact with the outer surface of said filter medium, said partitions defining a plurality of passageways therebetween which incline downwardly from said inner surface and toward the central zone of said filter, and means for moving said blow ring relative to said filter medium whereby progressively to deflect portions of said filter medium inwardly substantially into contact with the larger diameter ends of said partitions and progressively to dislodge solids from the inner surface of said filter medium into said passageways.

5. In a dust filter, the combination of a porous flexible filter medium, means for introducing dust laden gas to one side of said filter medium at a gaseous pressure higher than that existing on the other side of said filter medium, means on the high pressure side of said filter medium defining an accumulation zone to which solid particles separated from said dust laden gas may gravitate, a reverse jet cleaning device located on the low pressure side of said filter medium for dislodging solids from the high pressure side of said filter medium, said cleaning device being pressed against said filter medium in opposition to the pressure of the dust laden gas therein whereby to deflect adjacent portions of said filter medium inwardly of the high pressure side thereof, a plurality of partitions located on the high pressure side of said filter medium, said partitions having flexible edges extending into proximity with said high pressure side and being so constructed and arranged as to define a plurality of passageways extending downwardly from said high pressure side toward said accumulation zone, means for moving said cleaning device relative to said filter medium whereby successively to deflect portions of the high pressure side thereof into firm contact with the flexible edges of adjacent partitions and to dislodge accumulated solids from said high pressure side into the passageway between said adjacent partitions for gravitation therethrough to said accumulation zone.

6. In a dust filter, the combination of a porous flexible filter medium, means for introducing dust laden gas to one side of said filter medium at a gaseous pressure higher than that existing on the other side of said filter medium, means on the high pressure side of said filter medium defining an accumulation zone to which solid particles separated from said dust laden gas may gravitate, a reverse jet cleaning device located on the low pressure side of said filter medium for dislodging solids from the high pressure side of said filter medium, said cleaning device being pressed against said filter medium in opposition to the pressure of the dust laden gas therein whereby to deflect adjacent portions of said filter medium inwardly of the high pressure side thereof, a plurality of partitions located on the high pressure side of said filter medium, said partitions being made of relatively inflexible material and having extensions secured along one edge thereof, said extensions being made of flexible resilient material and having edges extending into proximity with said high pressure side, said partitions and the extensions thereof being so constructed and arranged as to define a plurality of passageways extending downwardly from said high pressure side toward said accumulation zone, means for moving said cleaning device relative to said filter medium whereby successively to deflect portions of the high pressure side thereof into firm contact with the edges of the flexible extensions on adjacent partitions and to dislodge accumulated solids from said high pressure side into the passageway between said adjacent partitions for gravitation therethrough to said accumulation zone.

7. In a dust filter, the combination of a porous flexible filter medium, means for supporting said filter medium in the shape of a vertically disposed cylinder, means for introducing dust laden gas to the upper region of the inside of said cylindrical filter medium at a gaseous pressure higher than that existing on the outside thereof, a reverse jet cleaning device for dislodging solids from the inner surface of said filter medium including a blow ring having a convex inner wall encircling said filter medium and having a narrow annular orifice therein, the inner diameter of said blow ring being such that a substantial area of said convex inner wall including said orifice is pressed firmly into contact with the outside surface of said filter medium, a plurality of open-ended frusto-conical partitions arranged in vertically spaced nested relation within said cylindrical filter medium, the smaller ends of said partitions being disposed downwardly and the larger diameter ends having flexible edges extending into proximity with the inner surface of said filter medium, the vertical spacing between said flexible edges being substantially smaller than the vertical dimension of the area of the convex inner wall of said blow ring which is in contact with the outer surface of said filter medium, said partitions defining a plurality of passageways therebetween which incline downwardly from said inner surface and toward the central zone of said filter, and means for moving said blow ring relative to said filter medium whereby progressively to deflect portions of said filter medium inwardly into firm contact with the flexible edges of said partitions and progressively to dislodge solids from the inner surface of said filter medium into said passageways.

8. In a dust filter, the combination of a porous flexible filter medium, means for supporting said filter medium in the shape of a vertically disposed cylinder, means for introducing dust laden gas to the upper region of the inside of said cylindrical filter medium at a gaseous pressure higher than that existing on the outside thereof, a reverse jet cleaning device for dislodging solids from the inner surface of said filter medium including a blow ring having a convex inner wall encircling said filter medium and having a narrow annular orifice therein, the inner diameter of said blow ring being such that a substantial area of said convex inner wall including said orifice is pressed firmly into contact with the outside surface of said filter medium, a plurality of open-ended frusto-conical partitions arranged in vertically spaced nested relation within said cylindrical filter medium, the smaller ends of said partitions being disposed downwardly and the larger diameter ends extending into proximity with the inner surface of said filter medium, each of said partitions having flexible resilient extensions secured to the larger diameter ends thereof, the edges of said extensions being substantially in contact with the inner surface of said filter medium, the vertical spacing between said edges being substantially smaller than the vertical dimension of the area of the convex inner wall of said blow ring which is in contact with the outer surface of said filter medium, said partitions defining a plurality of pasageways therebetween which incline downwardly from said inner surface and toward the central zone of said filter, and means for moving said blow ring relative to said filter medium whereby progressively to deflect portions of said filter medium inwardly into firm contact with the edges of the extensions on the larger diameter ends of said partitions and progressively to dislodge solids from the inner surface of said filter medium into said passageways.

9. In a dust filter, the combination of a porous flexible filter medium, means for supporting said filter medium in the shape of a vertically disposed cylinder, means for introducing dust laden gas to the upper region of the inside of said cylindrical filter medium at a gaseous pressure higher than that existing on the outside thereof, a reverse jet cleaning device for dislodging solids from the inner surface of said filter medium including a blow ring having a convex inner wall encircling said filter medium and having a narrow annular orifice therein, the inner diameter of said blow ring being such that a substantial area of said convex inner wall including said orifice is pressed firmly into contact with the outside surface of said filter medium, a plurality of open-ended frusto-conical partitions arranged in verticaly spaced nested relation within said cylindrical filter medium, the smaller ends of said partitions being disposed downwardly and the larger diameter ends extending into proximity with the inner surface of said filter medium, said partitions being made of springy sheet material and having the edges of the larger diameter ends serrated, the vertical spacing between said serrated edges being substantially smaller than the vertical dimension of the area of the convex inner wall of said blow ring which is in contact with the outer surface of said filter medium, said partitions defining a plurality of passageways therebetween which incline downwardly from said inner surface and toward the central zone of said filter, and means for moving said blow ring relative to said filter medium whereby progressively to deflect portions of said filter medium inwardly into firm contact with said serrated edges of said partitions and progressively to dislodge solids from the inner surface of said filter medium into said passageways.

HENRY J. HERSEY, JR.

REFERENCES CITED

The following references are of record in the file of this patent:

UNITED STATES PATENTS

| Number | Name | Date |
|---|---|---|
| 1,440,033 | Stevens et al. | Dec. 26, 1922 |
| 2,034,467 | Haber | Mar. 17, 1936 |
| 2,476,942 | Arnold | July 19, 1949 |